No. 871,943.

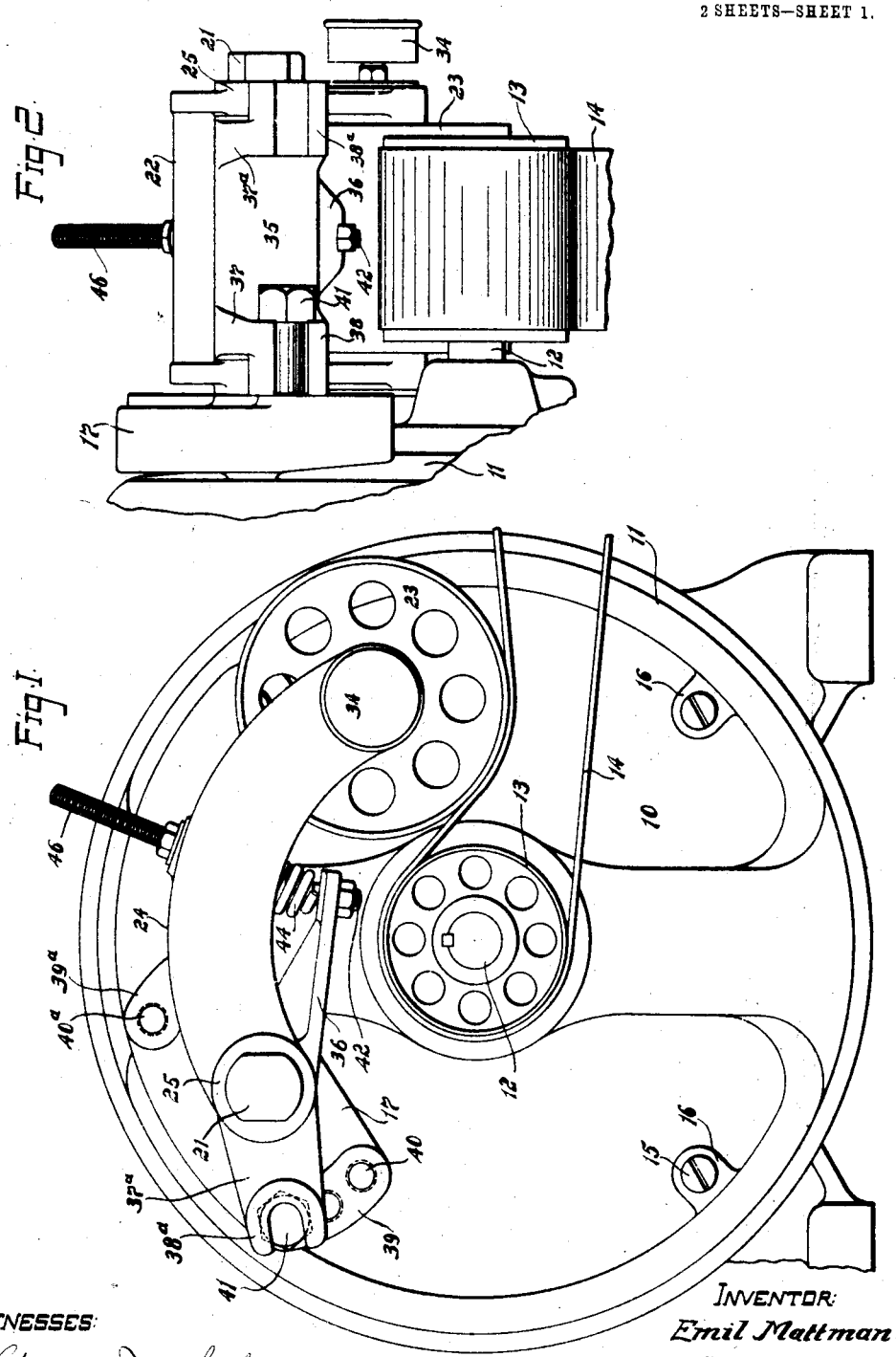

PATENTED NOV. 26, 1907.

E. MATTMAN.
BELT TIGHTENER.
APPLICATION FILED JAN. 2, 1906.

2 SHEETS—SHEET 2.

WITNESSES:
George J. Schwarz
Fred J. Kinsey

INVENTOR
Emil Mattman
By
Chas. E. Lord
ATTORNEY

UNITED STATES PATENT OFFICE.

EMIL MATTMAN, OF NORWOOD, OHIO, ASSIGNOR TO THE BULLOCK ELECTRIC MANUFACTURING COMPANY, A CORPORATION OF OHIO.

BELT-TIGHTENER.

No. 871,943.

Specification of Letters Patent.

Patented Nov. 26, 1907.

Application filed January 2, 1906. Serial No. 294,081.

*To all whom it may concern:*

Be it known that I, EMIL MATTMAN, a citizen of the Republic of Switzerland, residing at Norwood, in the county of Hamilton and State of Ohio, have invented certain new and useful Improvements in Belt-Tighteners, of which the following is a full, clear, and exact specification.

My invention relates to belt tighteners, and especially to belt tighteners adapted for use in connection with electric motors, although this application is not limited to such use.

Frequently small high speed motors are employed for driving machines or shaft pulleys, the speeds of which are required to be much lower than the speeds of the motors. It is necessary therefore to employ a pulley on the motor shaft which is much smaller than the driven pulley. If the difference between the diameters of the driving and driven pulleys is great, there will be a small angle of contact between the motor pulley and the driven belt, especially if the belt is short. Therefore there may be considerable slip between the motor pulley and the belt, and if the load is very great the motor will be unable to drive the belt at all, unless a belt tightener or idler pulley is employed for increasing the contact surface between the motor pulley and the belt.

The object of my invention is to provide a belt tightener which may be adjusted to properly engage the belt for any direction in which the belt may be led from the driving pulley.

Another object is to provide a belt tightener for an electric motor which may be applied to an ordinary standard motor casing.

A further object is to provide a motor with a belt tightener, the idler pulley of which may be adjusted to properly engage the belt for any position of the motor or direction in which the belt may extend from the motor pulley, or for either direction of rotation of the motor.

With these ends in view, my invention consists in the details of construction and combinations and arrangements of parts described in the specification and definitely set forth in the appended claims.

Figure 3:
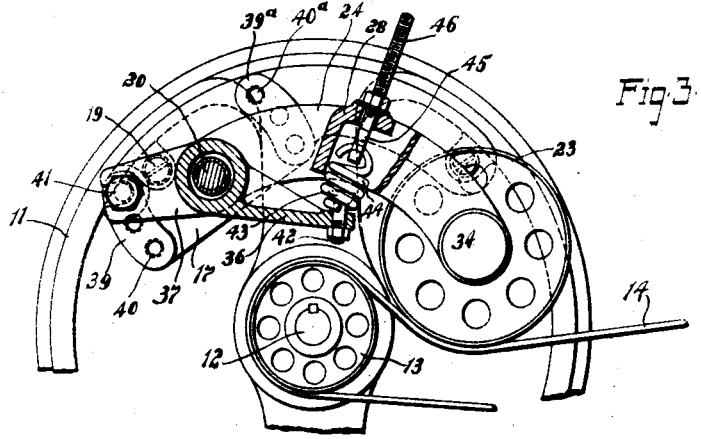
Figure 4:
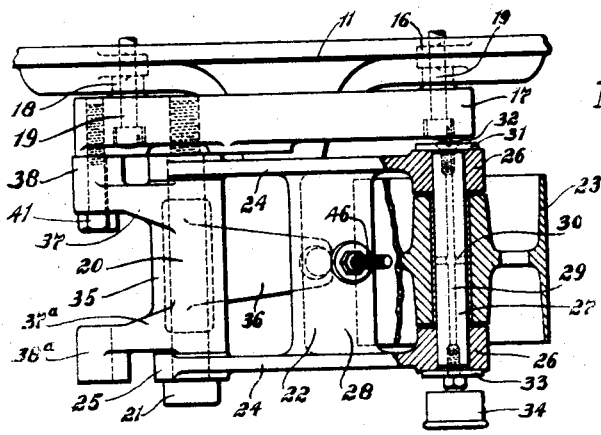
Figure 5:
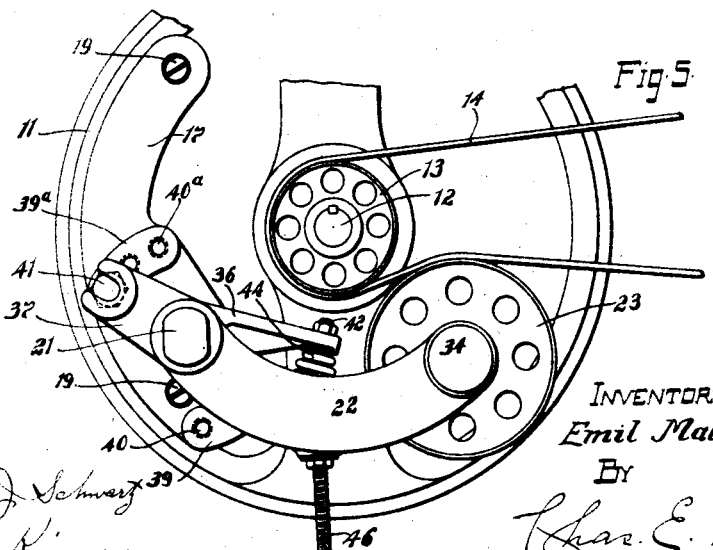

For a better understanding of my invention, reference is had to the accompanying drawings forming a part of this application, in which Figure 1 is an end elevation of a motor equipped with one of my improved belt tighteners; Fig. 2 is an elevation of a portion of the motor and the belt tightener looking from the left of Fig. 1; Fig. 3 is a partial end elevation and partial section (on a reduced scale) of the motor and belt tightener, in the position shown in Fig. 1; Fig. 4 is a plan of the same, portions being shown in section; and Fig. 5 is a partial end elevation of a motor with the belt in approximately the same position as shown in Fig. 1 but with the belt tightener in position for opposite rotation of the motor.

Electric motors may be placed in any position relative to the driven machine or pulley, and may be mounted on the floor, side wall or ceiling. Also motors for driving certain kinds of machines must be capable of rotating in either direction. If the direction of the belt is changed, or if the direction of rotation of the motor is changed, of course the position of the belt tightener must be changed. As my belt tightener is capable of adjustment for changes in position or direction of the belt, or for changes in direction of rotation of the driving pulley, it is especially adapted for use in connection with an electric motor, and I have therefore illustrated it as applied to a motor.

Referring to the different figures of the drawing, I have shown at 10 a motor having an end head 11 which has a bearing for shaft 12. Mounted on the end of the shaft is a driving pulley 13, about which extends the driving belt 14. The end head 11 is held to the casing by four bolts 15 which pass through lugs 16 on the end plate.

Mounted on the end head 11 of the motor is a sector plate 17. This plate is provided adjacent its ends with two lugs 18 having bolt holes, the distance between which is the same as the distance between the equally spaced bolt holes in the end head and casing through which pass the holding bolts 15. The sector plate is held to the end head of the motor by bolts 19, which replace the corresponding shorter bolts 15. The bolts 19 also serve to hold the end head 11 in place as is clearly understood. The inner faces of the lugs 18 engage the outer faces of the lugs 16 on the end head, and therefore when the bolts 19 are tightened the sector plate will be held firmly in place. It is seen that the sector plate can be held to the end head in any one of four different positions, by replacing any two adjacent bolts 15 with the bolts 19.

Mounted in the sector plate 17 adjacent one of its ends is a bolt or stud 20, screw threaded at one end and provided with an enlargement or head 21 at its other end. Pivotally mounted on this stud is the support 22 for the idler-pulley 23. This support consists in this case of two spaced, parallel, arched arms 24, each of which has at one end a bearing lug 25 through which the spindle 20 passes, and at its other end a bearing lug 26 for supporting the shaft or spindle 27 of the idler-pulley 23. The arched supporting arms are joined togethe rnear their center by a cross bar 28, substantially L-shaped in cross section, as is shown in Fig. 3.

The spindle 27 on which the idler-pulley is mounted is preferably provided with a longitudinal opening 29, which forms an oil chamber, and with lateral openings 30 leading from the oil chamber to the outer bearing surface. The spindle is held in place in the lugs 26 by a washer 31 and screw 32 at one end, and at the other end by the washer 33 and screw threaded extension of the oil cup 34.

Mounted on the bolt 20 between the arms 24 is a normally stationary member 35 having a forwardly extending arm 36, which forms an abutment for the pressure spring, as will be described later. The member 35, has also two rearwardly extending arms or lugs 37 and 37ª, which have respectively open-slotted, laterally extending lugs 38 and 38ª. The sector plate 17 has on its outer face two elongated curved lugs 39 and 39ª, equally spaced from and on opposite sides of the spindle or bolt 20. The sector plate is provided with two sets of equally spaced holes 40 and 40ª, located centrally of the lugs 39 and 39ª respectively. These holes are on arcs of circles concentric with the center of the spindle 20. As is shown in drawings, a bolt 41 extends through the open slot in the arm 37 and through the upper hole of the series 40 in the sector plate. If it is desired to adjust the position of the member 35, the bolt will be withdrawn from the upper hole and inserted in a similar manner in either of the other holes of the same series.

Mounted in the outer end of the arm 36 is a bolt 42 having a semi-spherical head 43, which is engaged by the end of a coiled spring 44. The opposite end of the spring engages a ring or hook 45 on the end of a bolt 46, which passes freely through the cross bar 28, joining the two arms of the idler-pulley support. A nut on the screw threaded portion of the bolt limits the downward movement of the bolt and provides a means for adjusting the tension of the spring. By means of the spring the pulley is held yieldingly and with constant pressure against the belt 14, the motor rotating clockwise.

If for any reason it is desired to change the position of the idler-pulley, the position of the arm 36, to which the spring 44 is attached can be changed by removing the bolt from the upper hole of the series 40, moving the arm 37 downward, and locking the same in position by inserting the bolt in either one of the other holes 40. It is seen that the three positions of the arm 37, corresponding to the three holes 40, provide three positions for the idler-pulley. It is evident that a greater number of adjustments could be obtained in this manner by increasing the number of holes. For the three positions just described, the arm 37 and open slot in the lug 38 are employed for locking the member 35 in its proper position. Now, if the direction in which the belt is led from the motor pulley is changed a considerable amount, the proper position of the idler pulley may be obtained by shifting the sector plate 17 to one of its three other positions, and if necessary, moving the bolt 41 to another of the holes 40. If the direction of rotation of the motor is reversed, the members 22 and 35 are likewise reversed to bring the other lug 25 and the lug 38ª adjacent to the sector plate 17. The member 35 can be locked in any desired position by means of the bolt 41, which will now pass through the open slot in the lug 38ª and engage one of the holes 40ª. In the same manner as before the small adjustments of the idler pulley may be obtained by moving the bolt 41 from one of the holes 40ª to another, while the larger adjustments may be obtained by shifting the sector-plate 17 from one of its positions to another. Thus by shifting the sector-plate 17 and the bolt 41 and by reversing the members 22 and 35, several different positions of the idler pulley may be obtained for each direction of rotation of the motor. By adjusting the nut on the bolt 46 an indefinite number of positions of the idler pulley may be obtained.

In Fig. 5 the sector-plate is shifted 90° from the position shown in Fig. 1 and the idler pulley is in position for counter-clockwise movement of the motor, the general direction in which the belt extends from the pulley on the motor shaft remaining substantially the same as in Fig. 1, where the direction of rotation is clockwise.

It is evident that many changes may be made in the details shown, and I aim in my claims to cover all changes and modifications which do not involve a departure from the spirit and scope of my invention.

What I claim as new and desire to secure by Letters Patent is:—

1. In combination, a shaft, an idler-pulley adjacent said shaft, a pivoted arm for said pulley, a tension-spring having one end attached to said arm, a normally stationary pivoted abutment to which the other end of the spring is attached, and means for locking said abutment in different positions to change the position of the idler-pulley.

2. In combination, a shaft, an idler-pulley, a stationary support, a bolt or stud attached to said support, an arm pivoted at one end to said bolt or stud and carrying at its other end said idler-pulley, a tension-spring attached at one end to said arm, and an adjustable member also mounted on said bolt or stud and forming an abutment for the other end of the tension-spring.

3. In combination, a shaft, a support, a bolt or stud extending from said support, an arm pivoted on said bolt or stud, an idler-pulley on the outer end of said arm, a normally stationary member mounted on said bolt or stud, a spring between said arm and said stationary member for holding the idler-pulley yieldingly against the belt, and means for locking said normally stationary member to said support in various positions of adjustment.

4. In combination, an electric motor, a plate mounted on said motor, a stud extending from said plate, an arm pivoted to said stud, an idler-pulley mounted on the outer end of said arm, a member mounted on said stud, a spring between the arm and said member, and means for locking said member to said plate in various positions of adjustment.

5. In combination, an electric motor having an end head, a sector-plate mounted on two adjacent bolts passing through said end head, a stud extending from said plate, an idler-pulley, a support therefor comprising an arm pivoted to said stud, a tension spring-abutment mounted on said stud, a tension spring between said pulley support and said abutment, and means for adjusting the position of said abutment.

6. In combination, an electric motor having a field-frame and an end-head, a plurality of bolts for attaching said end-head to the frame, a sector-plate mounted on two of said bolts, a stud on said plate, an idler-pulley, a support therefor mounted on said stud, a spring abutment also mounted on said stud, a spring between said pulley-support and said abutment, and means for adjusting said abutment.

7. In combination, an electric motor having a field-frame and an end-head, a plurality of bolts for attaching said end-head to the frame, a sector-plate mounted on two adjacent bolts, a stud on said plate, an idler-pulley, a support therefor pivoted to said stud, a spring-abutment also mounted on said stud, a spring between the support and the abutment, said plate being provided with a set of holes, and a bolt adapted to engage any one of said holes and said abutment to hold the latter in position.

8. In combination, an electric motor, a plate mounted on the end thereof, a stud on said plate, an idler-pulley, a support therefor mounted on said stud, a member also mounted on said stud, and having a forwardly extending arm and two rearwardly extending arms, a spring between the pulley-support and forwardly extending arm, said plate having on each side of the stud a set of spaced holes, and a bolt adapted to engage one of said rearwardly extending arms and a hole in one of said sets when the pulley is in one position, and adapted to engage the other of said rearwardly extending arms and a hole of the other set when the position of the pulley and support is reversed on said stud.

In testimony whereof I affix my signature, in the presence of two witnesses.

EMIL MATTMAN.

Witnesses:
FRED J. KINSEY,
ARTHUR F. KEVIS.